(12) United States Patent
Asari

(10) Patent No.: US 8,257,540 B2
(45) Date of Patent: Sep. 4, 2012

(54) METHOD OF MANUFACTURING LIQUID CRYSTAL DEVICE

(75) Inventor: Takehiro Asari, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 13/078,046

(22) Filed: Apr. 1, 2011

(65) Prior Publication Data

US 2011/0240217 A1     Oct. 6, 2011

(30) Foreign Application Priority Data

Apr. 2, 2010   (JP) .................................. 2010-085846

(51) Int. Cl.
*B32B 37/14*     (2006.01)
(52) U.S. Cl. ........................... 156/256; 156/64; 156/107
(58) Field of Classification Search ................... 156/64, 156/107, 256
See application file for complete search history.

(56) References Cited

U.S. PATENT DOCUMENTS

| | | | |
|---|---|---|---|
| 2009/0079912 A1* | 3/2009 | Asao | 349/98 |
| 2009/0109387 A1* | 4/2009 | Sakai et al. | 349/124 |
| 2009/0142490 A1 | 6/2009 | Ishida | |

FOREIGN PATENT DOCUMENTS

| | | |
|---|---|---|
| JP | 2008-003405 A | 1/2008 |
| JP | 2009-139497 A | 6/2009 |

* cited by examiner

*Primary Examiner* — Khanh P Nguyen
*Assistant Examiner* — John Blades
(74) *Attorney, Agent, or Firm* — AdvantEdge Law Group, LLC

(57) ABSTRACT

A method of manufacturing a liquid crystal device includes forming an alignment film on each of a first large-sized substrate and a second large-sized substrate each on which a plurality of substrates are arranged by an oblique evaporation method, dividing the plurality of substrates arranged on the first large-sized substrate while holding positional information of the plurality of substrates, and bonding one of the plurality of the divided substrates and a substrate arranged on the second large-sized substrate to each other in accordance with the held positional information.

5 Claims, 6 Drawing Sheets

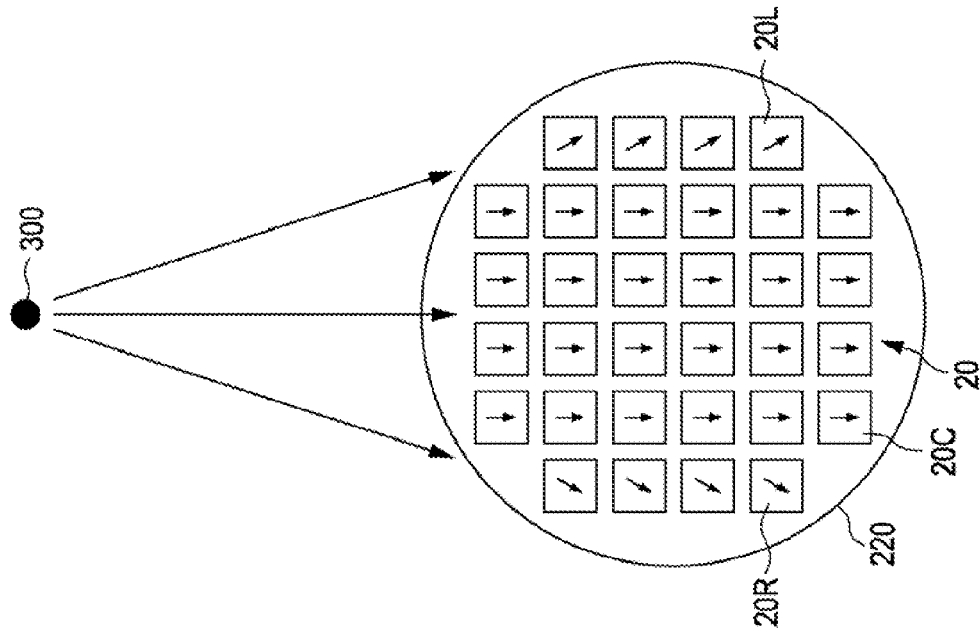
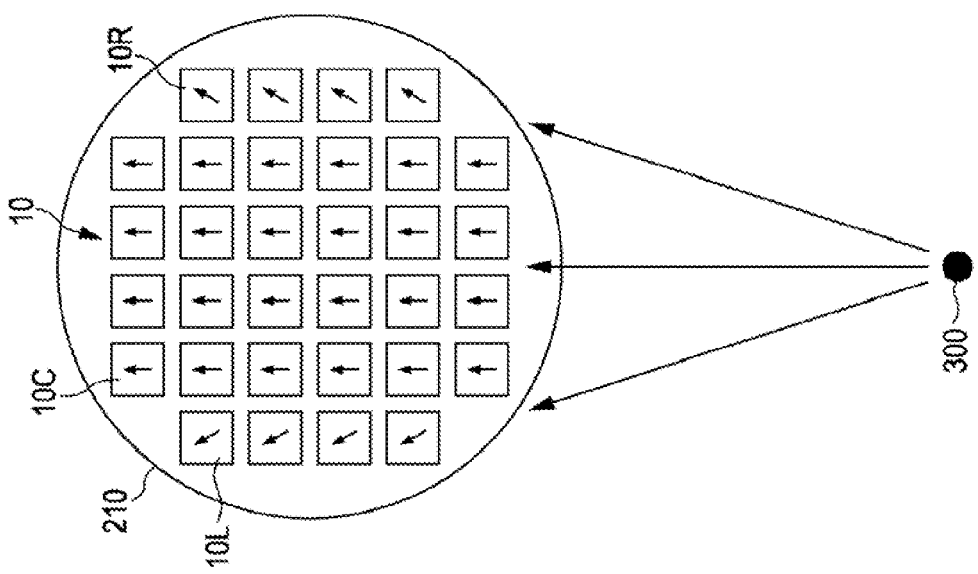

CLEAR VIEWING DIRECTION: ↑

CLEAR VIEWING DIRECTION: ↑

CLEAR VIEWING DIRECTION: ↑

CLEAR VIEWING DIRECTION: ↖

CLEAR VIEWING DIRECTION: ↗

METHOD OF MANUFACTURING LIQUID CRYSTAL DEVICE

BACKGROUND

1. Technical Field

The present invention relates to a technical field of a method of manufacturing a liquid crystal device.

2. Related Art

With a method of this type, deviation in evaporation azimuth angles between a pair of substrates of a liquid crystal device is tried to be suppressed. The deviation in evaporation azimuth angles is caused because an inorganic alignment film is formed on a large-sized substrate by an oblique evaporation method. For example, JP-A-2009-139497 discloses a method of evaporating an inorganic material on different film formation regions on a substrate at different film formation rates, when an inorganic alignment film is formed on a substrate having a large area by the oblique evaporation method. In JP-A-2009-139497, a relative positional relationship between the substrate and an evaporation preventing member having an opening for restricting a film formation region on the substrate is continuously changed. With this, the film formation region on the substrate is continuously changed. Therefore, the inorganic material can be evaporated on different film formation regions on the substrate at different film formation rates.

Alternatively, JP-A-2008-3405 discloses a method of making an arrangement direction of element substrates into a radial form so as to substantially correspond to an alignment direction of an alignment film adapted in a radial form from a point source when a plurality of element substrates are formed on a large-sized substrate. At this time, the arrangement direction of the element substrates is made into a radial form such that angles formed by long sides or short sides of the element substrates and alignment directions adapted in a radial form are substantially constant among element substrates.

However, in the above JP-A-2009-139497 and JP-A-2008-3405, there are technical problems that manufacturing process becomes relatively complicated or manufacturing cost is increased.

SUMMARY

An advantage of some aspects of the invention is to provided a method of manufacturing a liquid crystal device which can suppress deviation in evaporation azimuth angles between a pair of substrates of the liquid crystal device with a relatively simple method.

A method of manufacturing a liquid crystal device according to an aspect of the invention includes forming an alignment film on each of a first large-sized substrate and a second large-sized substrate each on which a plurality of substrates are arranged by an oblique evaporation method, dividing the plurality of substrates arranged on the first large-sized substrate while holding positional information of the plurality of substrates, and bonding one of the plurality of the divided substrates and a substrate arranged on the second large-sized substrate to each other in accordance with the held positional information.

With the method of manufacturing a liquid crystal device according to the aspect of the invention, in the forming, an alignment film is formed on each of the first large-sized substrate and the second large-sized substrate each on which a plurality of substrates are arranged by an oblique evaporation method. The plurality of substrates arranged on the first large-sized substrate are element substrates, for example. On the other hand, a plurality of substrates arranged on the second large-sized substrate are counter substrates, for example.

A liquid crystal device formed by the manufacturing method includes one substrate of the plurality of substrates arranged on the first large-sized substrate and one substrate of the plurality of substrates arranged on the second large-sized substrate.

In the dividing, a plurality of substrates arranged on the first large-sized substrate are divided while positional information thereof is held. "Positional information" is not limited to such strict positional information on the large-sized substrate that is indicated by an X coordinate and a Y coordinate. For example, "positional information" may be information indicating an area on which a plurality of substrates are arranged, such as x-th row from an end of the large-sized substrate, or a right half with respect to a center of the large-sized substrate.

Further, "positional information" is not limited to be included by each of the plurality of substrates arranged on the large-sized substrate (for example, a case where marks indicating the positional information are formed on each of the plurality of substrates). For example, a device which divides the large-sized substrate may store positional information of each of the plurality of substrates arranged on the large-sized substrate. Alternatively, containers which temporarily store substrates after divided may be made different depending on positions of each of the plurality of substrates on the large-sized substrate.

In the bonding, one substrate of a plurality of divided substrates and a substrate arranged on the second large-sized substrate are bonded to each other in accordance with the held positional information.

With the study made by the inventers of the invention, the following facts have been recognized. That is, if an alignment film is formed on a large-sized substrate having a diameter of larger than 20 cm by the oblique evaporation method, for example, angles of the evaporation (that is, evaporation angle), film thicknesses, and the like are made different among positions on the large-sized substrate. This is because since the evaporation source is a point source, broadening from the point source (that is, a solid angle at the time of viewing one position on the large-sized substrate from the point source) is larger toward ends of the large-sized substrate. Then, there is a possibility that a uniform liquid crystal panel characteristics (for example, pretilt angle, transmissivity, and the like) cannot be obtained on the surface of the large-sized substrate. As a result, there is a possibility that an image quality of the manufactured liquid crystal device is deteriorated, for example. In order to eliminate the problem, a method of suppressing azimuth angle distribution particularly by changing film formation conditions, or devising arrangement (chip arrangement) of substrates on the surface of the large-sized substrate is proposed. However, there is a possibility that a manufacturing process become relatively complicated or manufacturing cost is increased.

In the aspect of the invention, in the dividing, the plurality of substrates arranged on the first large-sized substrate are divided while holding the positional information thereof. Further, in the bonding, one substrate of the plurality of divided substrates and a substrate arranged on the second large-sized substrate are bonded to each other in accordance with the held positional information.

To be more specific, for example, one substrate (for example, counter substrate) of the plurality of divided substrates and a substrate (for example, element substrate) arranged on the second large-sized substrate, which has azimuth angle distribution so as to complement the azimuth angle distribution on the above one substrate, are bonded to each other in accordance with the held positional information.

Alternatively, when one substrate of the plurality of divided substrates and a substrate arranged on the second large-sized substrate are bonded to each other, the above one substrate is rotated along a substrate surface of the above one substrate in accordance with the held positional information such that the azimuth angle distributions thereof are complemented to each other. In this case, for example, the counter substrate is configured as a substrate of which bonding direction to the element substrate is not previously defined (that is, substrate having no assembly misalignment).

In such a manner, in the aspect of the invention, in particular, the azimuth angle distribution is complemented not by a process in which the alignment film is formed on the large-sized substrate but by a method of bonding the divided substrates. Therefore, with the method of manufacturing a liquid crystal device according to the aspect of the invention, deviation in evaporation azimuth angles between a pair of substrates of the liquid crystal device can be suppressed by a relatively simple method. Accordingly, a liquid crystal device which can display a bright and high-quality image can be provided.

In the method of manufacturing the liquid crystal device according to the aspect of the invention, it is preferable that the positional information be defined with reference to an evaporation source.

According to the aspect of the invention, azimuth angle distribution generated by the oblique evaporation method can be identified from the positional information relatively easily. As a result, a substrate arranged on the second large-sized substrate, which should be bonded to one substrate of the first large-sized substrate, can be determined relatively easily. Further, one substrate can be rotated along a substrate surface of the one substrate.

In the aspect of the invention in which the positional information is defined with reference to the evaporation source, it is preferable that in the bonding, the one substrate arranged on one side of right and left sides on the first large-sized substrate with reference to the evaporation source be bonded to a substrate arranged on the one side of right and left sides on the second large-sized substrate with reference to the evaporation source in accordance with the held positional information.

With this configuration, deviation in evaporation azimuth angles between one substrate on the first large-sized substrate and the substrate on the second large-sized substrate can be appropriately suppressed.

Alternatively, in the aspect of the invention in which the positional information is defined with reference to the evaporation source, it is preferable that in the bonding, the one substrate arranged on an end of one side of right and left sides on the first large-sized substrate with reference to the evaporation source be bonded to a substrate arranged on an end of the one side of right and left sides on the second large-sized substrate with reference to the evaporation source in accordance with the held positional information.

With this configuration, deviation in evaporation azimuth angles between one substrate on the first large-sized substrate and a substrate on the second large-sized substrate can be appropriately suppressed.

In the method of manufacturing a liquid crystal device according to another aspect of the invention, it is preferable that, in the bonding, the one substrate be rotated along the substrate surface of the one substrate in accordance with the held positional information.

According to the aspect of the invention, degree of freedom in combinations of one substrate and a substrate arranged on a different large-sized substrate, which is to be bonded to the one substrate, can be increased. This makes an advantage in a practical use.

Actions and other advantages of the aspect of the invention will be obvious from a mode for carrying out the aspects of the invention which will be described later.

BRIEF DESCRIPTION OF THE DRAWINGS

The invention will be described with reference to the accompanying drawings, wherein like numbers reference like elements.

FIGS. 3A and 3B are process views for explaining an alignment film formation process in a manufacturing method according to the embodiment of the invention.

DESCRIPTION OF EXEMPLARY EMBODIMENTS

Figure 1:
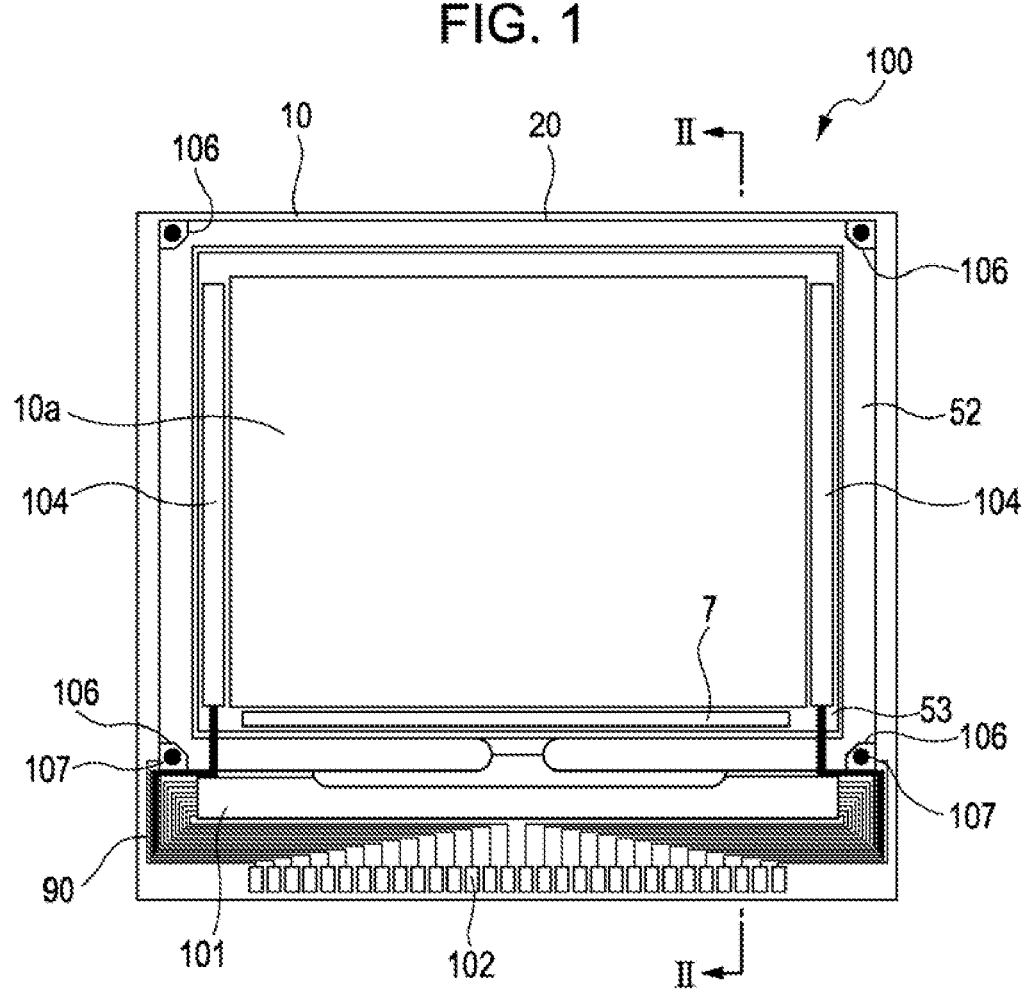
FIG. 1 is a plan view illustrating a liquid crystal device according to an embodiment of the invention together with components formed on a TFT array substrate when seen from the side of a counter substrate.

Hereinafter, a method of manufacturing a liquid crystal device according to an embodiment of the invention is described with reference to drawings. It is to be noted that scales are made different for each layer and each member in the following drawings in order to make each layer and each member to be recognizable sizes in the drawings.

Liquid Crystal Device

At first, an embodiment of a liquid crystal device manufactured by a method of manufacturing a liquid crystal device according to the invention is described with reference to FIG. 1 and FIG. 2. In the embodiment, an active matrix driving system liquid crystal device with a built-in driving circuit is used as an example of the liquid crystal device.

An entire configuration of the liquid crystal device according to the embodiment is described with reference to FIG. 1 and FIG. 2. FIG. 1 is a plan view illustrating the liquid crystal device according to the embodiment together with components formed on a Thin Film Transistor (TFT) array substrate when seen from the side of a counter substrate. FIG. 2 is a cross-sectional view of FIG. 1 along a line II-II.

Figure 2:
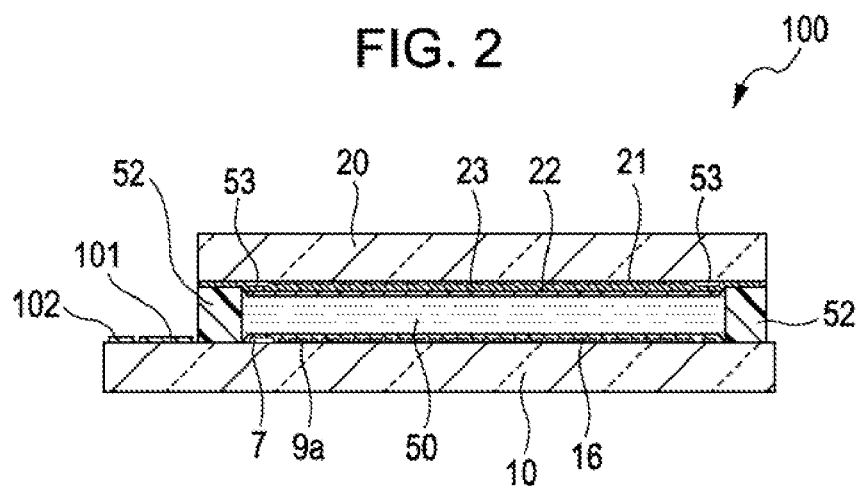
FIG. 2 is a cross-sectional view of FIG. 1 along a line II-II.

In FIG. 1 and FIG. 2, a TFT array substrate 10 and a counter substrate 20 are disposed so as to be opposed to each other in a liquid crystal device 100 according to the embodiment. The TFT array substrate 10 is formed by a substrate such as a quartz substrate, a glass substrate or a silicon substrate, for example. The counter substrate 20 is formed by a substrate such as a quartz substrate or a glass substrate, for example. A liquid crystal layer 50 is sealed between the TFT array substrate 10 and the counter substrate 20. The TFT array substrate 10 and the counter substrate 20 are adhered to each other with a sealing member 52. The sealing member 52 is provided on a sealing region located in the periphery of an image display region 10a.

The sealing member 52 is formed by an ultraviolet curable resin, a heat curable resin, an ultraviolet-heat curable resin, or the like, for example, for bonding both of the substrates together. The sealing member 52 is cured by ultraviolet irradiation, hating, or the like after being applied onto the TFT array substrate 10 in the manufacturing process. The sealing member 52 contains a gap material such as glass fibers or glass beads, dispersed therein for obtaining a predetermined space (that is, gap) between the TFT array substrate 10 and the counter substrate 20. It is to be noted that the gap material may be disposed on the image display region 10a or the peripheral region of the image display region 10a in addition to or in place of mixing into the sealing member 52.

In FIG. 1, a frame-shaped light-shielding film 53 having light shielding property is provided on the side of the counter substrate 20 so as to be parallel with an inner side of the sealing region on which the sealing member 52 is disposed. The frame-shaped light-shielding film 53 defines the image display region 10a. Note that a part or an entire of the frame-shaped light-shielding film 53 may be provided on the side of the TFT array substrate 10 as a built-in light shielding film.

In the peripheral region, a data line driving circuit 101 and external circuit connecting terminals 102 are provided along one side of the TFT array substrate 10 at the outside of the sealing region on which the sealing member 52 is disposed. A sampling circuit 7 is provided on the inner side of the sealing region along the above one side so as to be covered by the frame-shaped light-shielding film 53. Further, scanning line driving circuits 104 are provided on frame regions which are inner side of the sealing region along two sides adjacent to the above one side so as to be covered by the frame-shaped light-shielding film 53.

Vertical conducting terminals 106 are disposed on the TFT array substrate 10 at regions corresponding to four corners of the counter substrate 20 in order to connect both the substrates through vertical conducting materials 107. Therefore, the TFT array substrate 10 and the counter substrate 20 are electrically conducted with each other. Further, a distributing wiring pattern 90 for electrically connecting the external circuit connecting terminals 102, the data line driving circuit 101, the scanning line driving circuits 104, the vertical conducting terminals 106, and the like is formed.

In FIG. 2, a laminate structure in which pixel switching transistors as driving elements, wirings such as scanning lines and data lines are configured is formed on the TFT array substrate 10. Although a detail configuration of the laminate structure is not illustrated in FIG. 2, pixel electrodes 9a formed with Indium Tin Oxide (ITO) are formed on the laminate structure in a predetermined island pattern for each pixel.

The pixel electrodes 9a are formed on the image display region 10a on the TFT array substrate 10 so as to be opposed to the counter electrode 21, which will be described later. An alignment film 16 is formed on a surface of the TFT array substrate 10, which faces to the liquid crystal layer 50, that is, on the pixel electrodes 9a. At this time, the alignment film 16 is formed so as to cover the pixel electrodes 9a. It is to be noted that the alignment film 16 and an alignment film 22, which will be described later, are inorganic alignment films formed by an oblique evaporation method.

A light shielding film 23 is formed on an opposing surface of the counter substrate 20, which is opposed to the TFT array substrate 10. The light shielding film 23 is formed on the opposing surface of the counter substrate 20 in a lattice pattern when seen from the above, for example. Non-opening regions are defined by the light shielding film 23 on the counter substrate 20. The regions divided by the light shielding film 23 correspond to opening regions through which light output from a lamp for a projector or a viewing backlight is transmitted. It is to be noted that the light shielding film 23 may be formed into a stripe pattern so that the non-opening regions are defined by the light shielding film 23 and the various components such as the data lines provided on the TFT array substrate 10.

Counter electrodes 21 formed with ITO are formed on the light shielding film 23 so as to be opposed to the plurality of pixel electrodes 9a. A color filter (not shown in FIG. 2) may be formed on the light shielding film 23 at a region including portions of the opening regions and the non-opening regions for performing color-display on the image display region 10a. The alignment film 22 is formed on the counter electrodes 21 on the opposing surface of the counter substrate 20.

A precharge circuit, an inspection circuit, and the like may be formed on the TFT array substrate 10 as illustrated in FIG. 1 and FIG. 2 in addition to the data line driving circuit 101, the scanning line driving circuits 104, the sampling circuit 7, and the like. The precharge circuit is a circuit for supplying a precharge signal at a predetermine voltage level to a plurality of data lines prior to image signals. The inspection circuit is a circuit for inspecting quality, defects, and the like of the liquid crystal device during the manufacturing or at the time of the shipping.

Manufacturing Method

Next, a method of manufacturing a liquid crystal device according to an embodiment of the invention is described with reference to FIG. 3A through FIG. 7B. It is to be noted that the method of manufacturing a liquid crystal device which will now be described below is a method of manufacturing the above liquid crystal device 100. Therefore, common reference numerals denote parts which are common to those in the above liquid crystal device 100 for the convenience of explanation and detail description is not repeated.

A plurality of TFT array substrates 10 are formed at once on a large-sized substrates 210 and a plurality of counter substrates 20 are formed at once on a large-sized substrates 220 as illustrated in FIGS. 3A and 3B. Note that the TFT array substrate 10 and the counter substrate 20 constitute the above liquid crystal device 100. FIGS. 3A and 3B are process views for explaining an alignment film formation process in the manufacturing method according to the embodiment of the invention.

In FIG. 3A, the alignment film 16 is formed on the large-sized substrate 210 through predetermined manufacturing processes by the oblique evaporation method. The plurality of TFT array substrates 10 on which the pixel electrodes 9a (see, FIG. 2) are formed are arranged on the large-sized substrate 210.

In this case, distribution of azimuth angles (see, arrows illustrated on the TFT array substrate 10 in FIG. 3A) is caused on the alignment film 16 formed on the large-sized substrate 210. The distribution of azimuth angles is caused due to a solid angle at the time of viewing the large-sized substrate 210 from an evaporation source 300. To be more specific, for example, an azimuth angle of the alignment film 16 on a TFT array substrate 10C arranged in the vicinity of a center of the large-sized substrate 210 is along the vertical direction of a paper plane in FIG. 3A. However, azimuth angles of the alignment film 16 on TFT array substrates 10R and 10L arranged on ends of the large-sized substrate 210 are deviated from the vertical direction of the paper plane in FIG. 3A.

On the other hand, in FIG. 3B, the alignment film 22 is formed on the large-sized substrate 220 through predetermined manufacturing processes by the oblique evaporation method. The plurality of counter substrates 20 on which the counter electrodes 21 (see, FIG. 2) are formed are arranged on the large-sized substrate 220.

In this case, as in the large-sized substrate 210, distribution of azimuth angles (see, arrows illustrated on the counter substrate 20 in FIG. 3B) is caused on the alignment film 22 formed on the large-sized substrate 220. The distribution of azimuth angles is caused due to a solid angle at the time of viewing the large-sized substrate 220 from the evaporation source 300. To be more specific, for example, an azimuth angle of the alignment film 22 on a counter substrate 20C arranged in the vicinity of a center of the large-sized substrate 220 is along the vertical direction of a paper plane in FIG. 3B. However, azimuth angles of the alignment film 22 on counter substrates 20R and 20L arranged on ends of the large-sized substrate 220 are deviated from the vertical direction of the paper plane in FIG. 3B.

Next, in a dividing process, a plurality of substrates (for example, counter substrates 20) arranged on at least one of the large-sized substrates 210 and 220 are divided while positional information thereof is held.

Next, in a bonding process, one substrate (for example, counter substrate 20) of the plurality of divided substrates and a substrate (for example, TFT array substrate 10) arranged on the large-sized substrate which is a different large-sized substrate on which the above one substrate has been arranged are bonded to each other. At this time, these substrates are bonded to each other in accordance with the held positional information such that a clear viewing direction of the obtained liquid crystal device 100 is made constant.

Figure 4A:
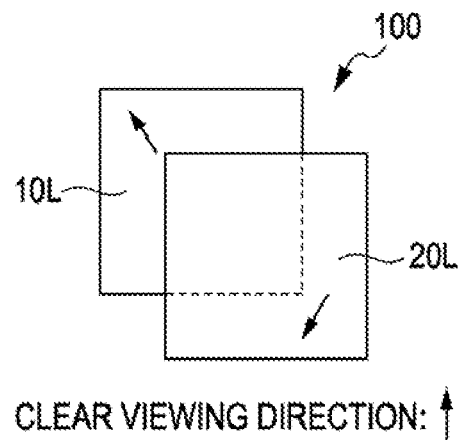
FIGS. 4A through 4C are process views for explaining a bonding process in the manufacturing method according to the embodiment of the invention.
Figure 4B:
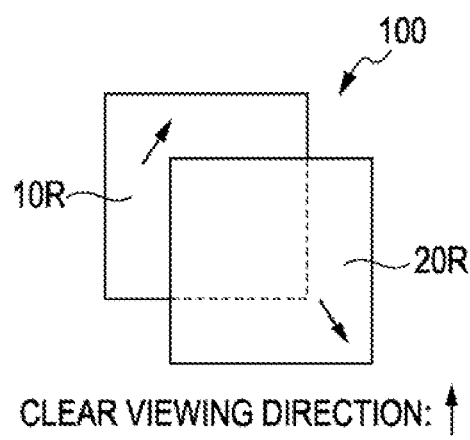

To be more specific, for example, the TFT array substrate 10L and the counter substrate 20L are bonded to each other in accordance with the held positional information as illustrated in FIG. 4A. Alternatively, as illustrated in FIG. 4B, the TFT array substrate 10R and the counter substrate 20R are bonded to each other in accordance with the held positional information. Furthermore, as illustrated in FIG. 4C, the TFT array substrate 10C and the counter substrate 20C are bonded to each other in accordance with the held positional information.

Figure 4C:
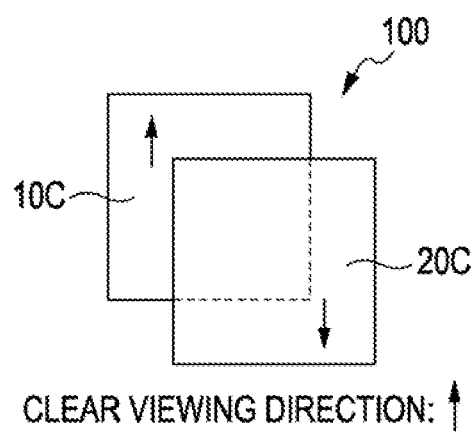

All of combinations of the TFT array substrates 10L, 10R, and 10C and the counter substrates 20L, 20R, and 20C as illustrated in FIGS. 4A through 4C are combinations by which clear viewing directions of the obtained liquid crystal devices 100 are directions along the vertical direction of a paper plane in FIGS. 4A through 4C. FIGS. 4A through 4C are process views for explaining the bonding process in the manufacturing method according to the embodiment of the invention. It is to be noted that in FIGS. 4A through 4C, arrows illustrated on the TFT array substrates 10L, 10R and 10C and the counter substrates 20L, 20R and 20C indicate azimuth angles of the alignment film 16 or 22. When the counter substrate 20 is bonded to the TFT array substrate 10, front and back sides thereof on the paper plane are reversed. Therefore, the azimuth angles of the counter substrates 20 as illustrated in FIGS. 4A through 4C are reversed from the azimuth angles as illustrated in FIG. 3B.

Figure 5A:
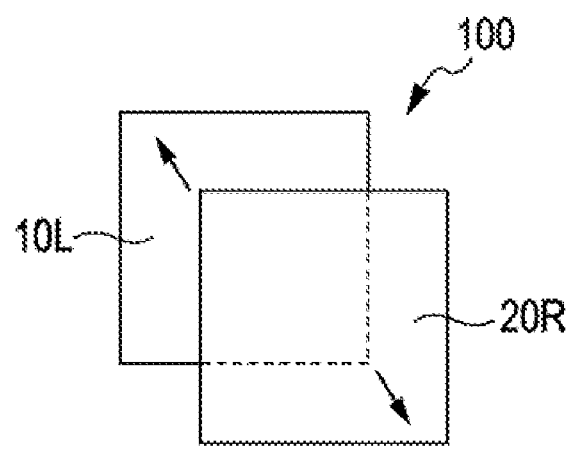
FIGS. 5A and 5B are process views for explaining a bonding process in the manufacturing method according to a comparative example.
Figure 5B:
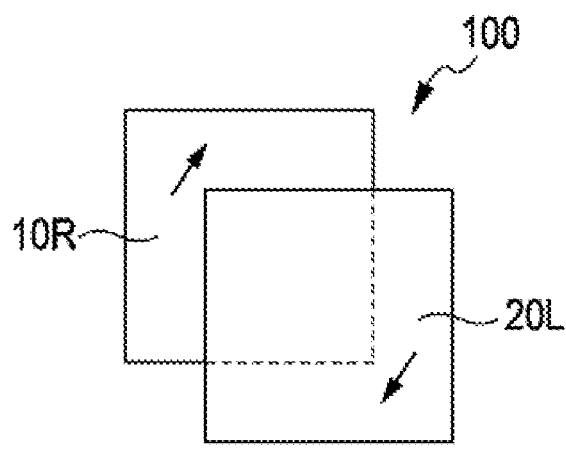

It is assumed that the TFT array substrate 10L and the counter substrate 20R are bonded to each other as illustrated in FIG. 5A or the TFT array substrate 10R and the counter substrate 20L are bonded to each other as illustrated in FIG. 5B, while the positional information of the divided substrates on the large-sized substrates is not held. In such case, the clear viewing directions of the obtained liquid crystal device 100 are varied. FIGS. 5A and 5B are process views for explaining a bonding process in a manufacturing method according to a comparative example in the same manner as FIGS. 4A through 4C.

In the embodiment, in the bonding process, the combination of the TFT array substrate 10 and the counter substrate 20 to be bonded together is determined in accordance with the positional information of the divided substrates on the large-sized substrate as described above. Therefore, the clear viewing directions of the obtained liquid crystal device 100 can be made uniform as a constant direction. As a result, a variation in transmissivity of the obtained liquid crystal device 100 can be suppressed. Accordingly, according to the embodiment, the liquid crystal device 100 which can display a bright and high-quality image can be provided.

Further, the large-sized substrate can be further increased in size or a distance between the large-sized substrate and the evaporation source can be reduced. In particular, the alignment film formation process can be made shorter or the manufacturing cost can be reduced by reducing the distance between the large-sized substrate and the evaporation source, for example. This leads to an advantage in a practical use.

Figure 6A:
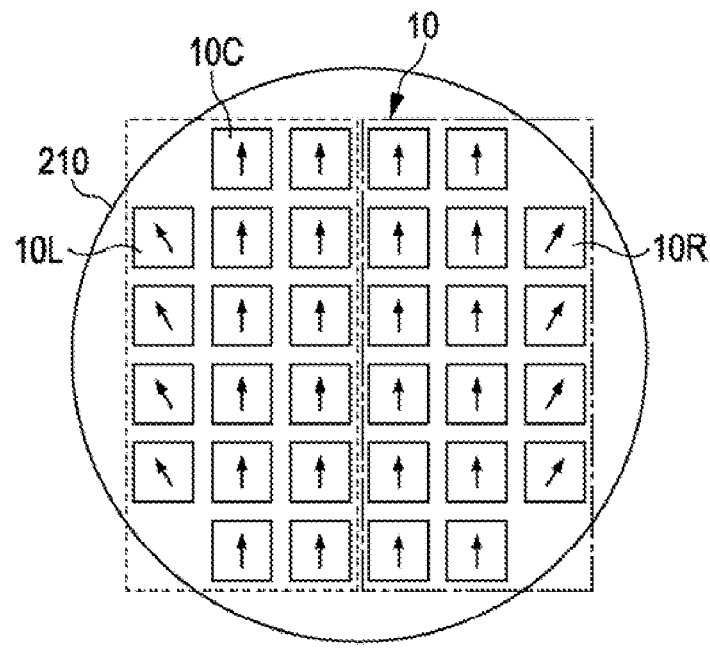
FIGS. 6A and 6B are conceptual views illustrating an example of a concept of positional information according to the embodiment of the invention.
Figure 6B:
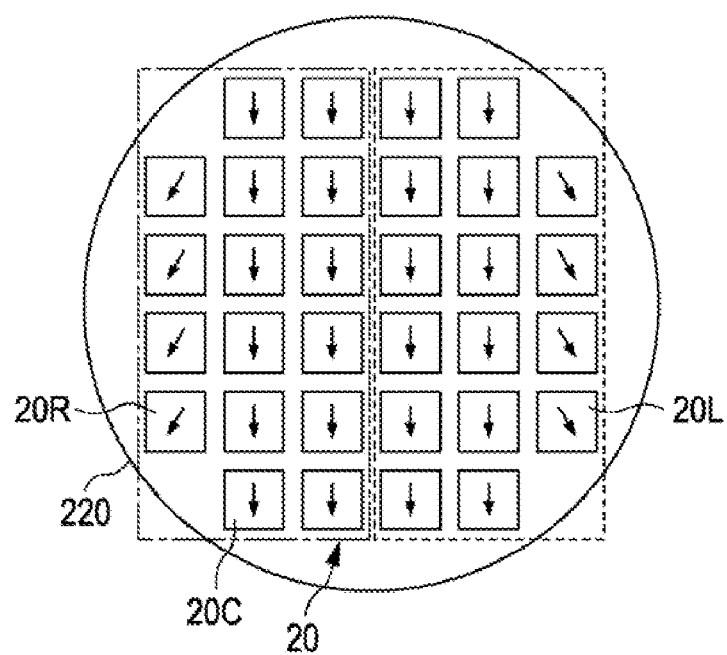

"Positional information" according to the embodiment is defined as one side (for example, a region surrounded by a dashed-dotted line) of the plane obtained by bisecting the large-sized substrate 210 with a perpendicular, which includes the evaporation source 300, and the other side (for example, a region surrounded by a dashed line) of the plane with reference to the evaporation source 300, as illustrated in FIG. 6A. In the same manner, "positional information" is defined as one side (for example, a region surrounded by a dashed-dotted line) of the plane obtained by bisecting the large-sized substrate 220 with a perpendicular, which includes the evaporation source 300, and the other side (for example, a region surrounded by a dashed line) of the plane, as illustrated in FIG. 6B.

Figure 7A:
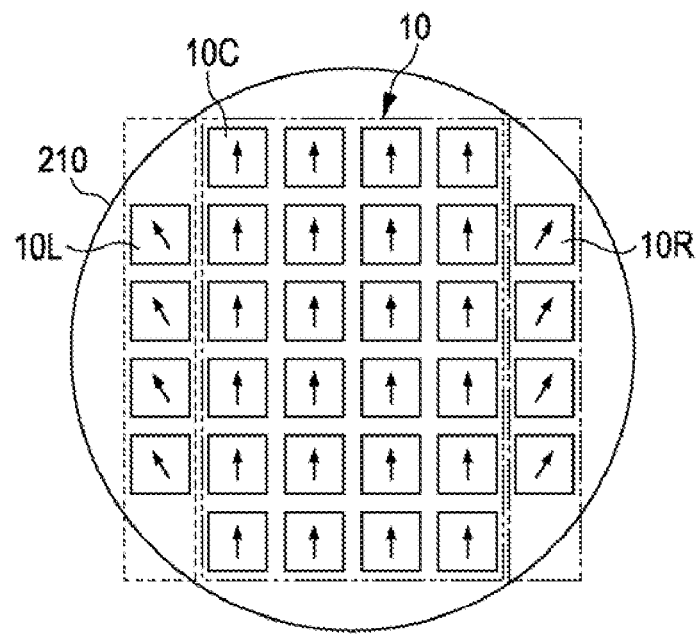
FIGS. 7A and 7B are conceptual views illustrating another example of a concept of positional information according to the embodiment of the invention.
Figure 7B:
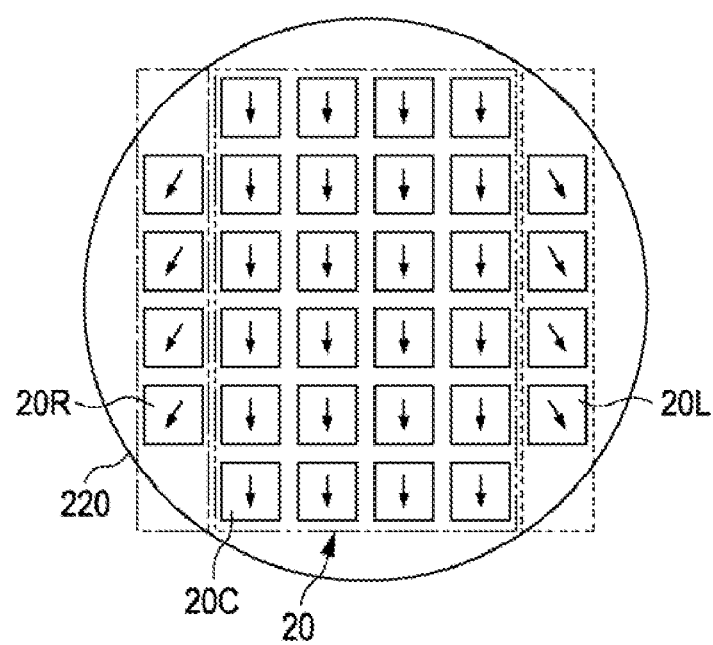

Alternatively, as illustrated in FIG. 7A, "positional information" is defined as a center portion (a region surrounded by a dashed-two dotted line in FIG. 7A) of the large-sized substrate 210, a right end portion (a region surrounded by a dashed-dotted line in FIG. 7A) and a left end portion (a region surrounded by a dashed line in FIG. 7A). In the same manner, as illustrated in FIG. 7B, "positional information" is defined as a center portion (a region surrounded by a dashed-two dotted line in FIG. 7B) of the large-sized substrate 220, a left end portion (a region surrounded by a dashed-dotted line in FIG. 7B) and a right end portion (a region surrounded by a dashed line in FIG. 7B).

Alternatively, "positional information" may be defined for each of the plurality of TFT array substrates 10 and the plurality of counter substrates 20 with reference to the evaporation source 300, for example.

In addition, "positional information" according to the embodiment is held by making containers which temporarily store the divided substrates (for example, counter substrates 20) different depending on positions of the divided substrates on the large-sized substrate. To be more specific, when the positional information is defined as illustrated in FIGS. 6A and 6B, for example, the counter substrates 20 arranged on the region surrounded by the dashed-dotted line are temporarily stored in one container and the counter substrates 20 arranged on the region surrounded by the dashed line are temporarily stored in another container which is different from the above one container. In such a manner, the positional information is held.

It is to be noted that positional information may be held by forming a mark indicating positional information on each of the plurality of TFT array substrates 10 and the plurality of counter substrates 20 which are arranged on each of the large-sized substrates 210 and 220.

FIGS. 6A and 6B are conceptual views illustrating an example of a concept of positional information according to the embodiment of the invention. FIGS. 7A and 7B are conceptual views illustrating another example of a concept of positional information according to the embodiment of the invention.

Variations

Next, a variation of the embodiment is described. In the above embodiment, in the bonding process, the combination of the TFT array substrate 10 and the counter substrate 20 to be bonded together is determined in accordance with the positional information of the divided substrates on the large-sized substrate. However, in the variation, one substrate of the TFT array substrate 10 and the counter substrate 20 is rotated along a substrate surface thereof in accordance with the positional information of the divided substrates on the large-sized substrate such that a clear viewing direction of the obtained liquid crystal device 100 is made constant.

With this configuration, even when the TFT array substrate 10 and the counter substrate 20 are combined as illustrated in FIG. 5A or 5B, the clear viewing direction of the obtained liquid crystal device 100 can be made uniform as a constant direction appropriately. Note that in the variation, the counter substrates 20 having no assembly misalignment are supposed to be used.

The invention is not limited to the above embodiment and can be appropriately modified without departing from the scope and spirit of the invention read from the aspects of the invention and the entire specification. Further, a method of manufacturing a liquid crystal device including such modification is also encompassed in a technical range of the invention.

The entire disclosure of Japanese Patent Application No. 2010-085846, filed Apr. 2, 2010 is expressly incorporated by reference herein.

What is claimed is:

1. A method of manufacturing a liquid crystal device comprising:
    forming an alignment film on each of a first large-sized substrate and a second large-sized substrate each on which a plurality of substrates are arranged by an oblique evaporation method;
    dividing the plurality of substrates arranged on the first large-sized substrate while holding positional information of the plurality of substrates; and
    bonding one of the plurality of the divided substrates and a substrate arranged on the second large-sized substrate to each other in accordance with the held positional information.

2. The method of manufacturing a liquid crystal device according to claim 1,
    wherein the positional information is defined with reference to an evaporation source.

3. The method of manufacturing a liquid crystal device according to claim 2,
    wherein, in the bonding, the one substrate arranged on one side of right and left sides on the first large-sized substrate with reference to the evaporation source is bonded to a substrate arranged on the one side of right and left sides on the second large-sized substrate with reference to the evaporation source in accordance with the held positional information.

4. The method of manufacturing a liquid crystal device according to claim 2,
    wherein, in the bonding, the one substrate arranged on an end of one side of right and left sides on the first large-sized substrate with reference to the evaporation source is bonded to a substrate arranged on an end of the one side of right and left sides on the second large-sized substrate with reference to the evaporation source in accordance with the held positional information.

5. The method of manufacturing a liquid crystal device according to claim 1,
    wherein, in the bonding, the one substrate is rotated along a substrate surface of the one substrate in accordance with the held positional information.

* * * * *